F. A. POLZIN.
PLOW.
APPLICATION FILED MAY 28, 1913.
1,120,531.
Patented Dec. 8, 1914.
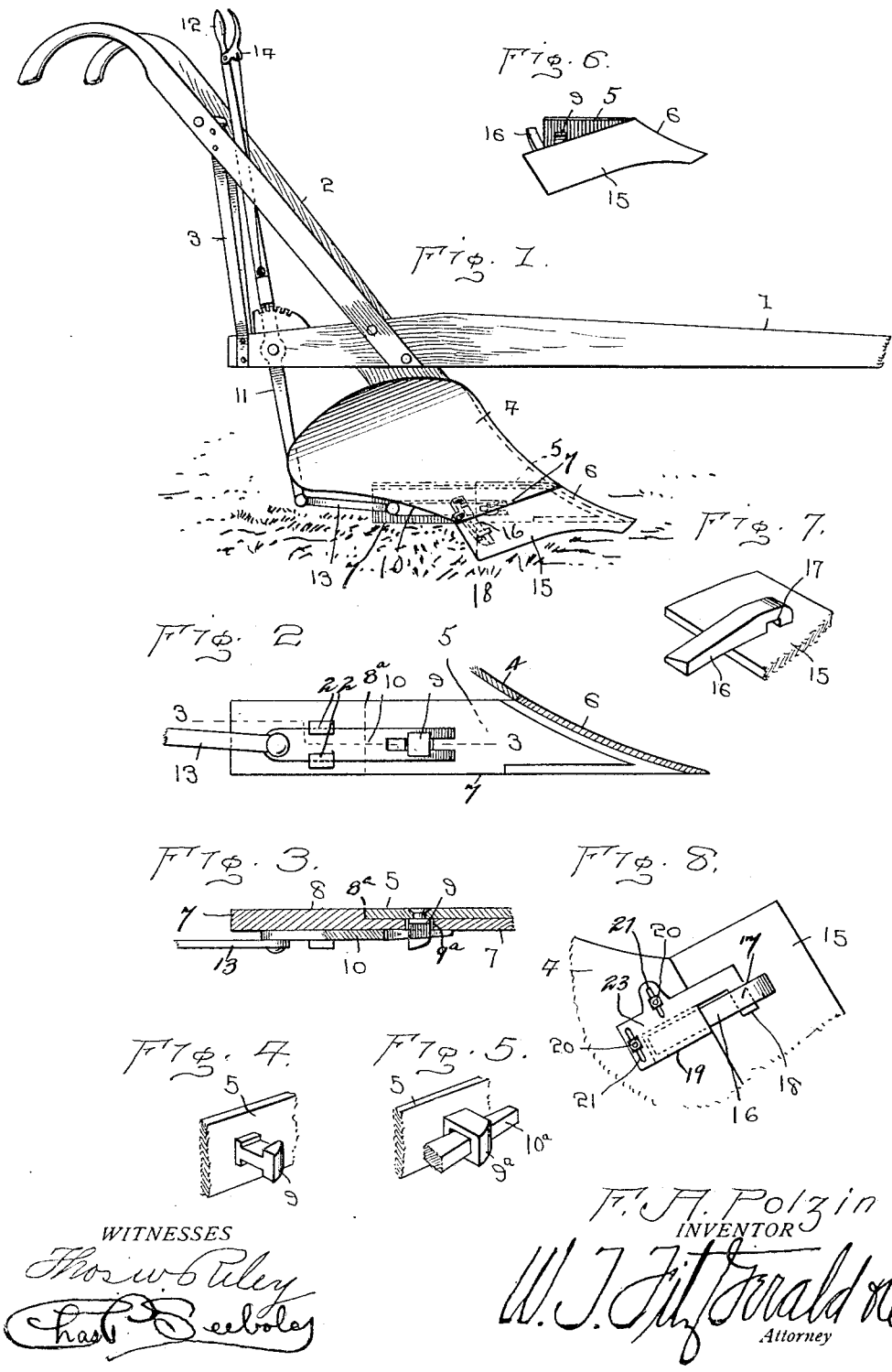

UNITED STATES PATENT OFFICE.

FREDERICK A. POLZIN, OF AUDUBON, IOWA.

PLOW.

1,120,531. Specification of Letters Patent. Patented Dec. 8, 1914.

Application filed May 28, 1913. Serial No. 770,337.

*To all whom it may concern:*

Be it known that I, FREDERICK ALBERT POLZIN, a citizen of the United States, residing at Audubon, in the county of Audubon and State of Iowa, have invented certain new and useful Improvements in Plows; and I do hereby declare the following to be a full, clear, and exact description of the invention, such as will enable others skilled in the art to which it appertains to make and use the same.

This invention relates to plows generally and more particularly to detachable shares therefor.

The invention has for its object the provision of a means to quickly and reliably attach a plow point and share to a breaking or mold board plow or to detach it from the said plow.

Improved details in the construction and arrangement of the various parts of the invention will be apparent from the detailed description hereinafter when read in connection with the appended claims, reference being had to the accompanying drawings forming part thereof, in which, Figure 1 is a side elevation of the plow illustrating in perspective the same with the present invention applied thereto. Fig. 2 is a fragmental sectional view showing the inner side of the land side of the plow with the fastening members for securing the share thereto. Fig. 3 represents a horizontal sectional view on the line 3—3 of Fig. 2. Fig. 4 represents a detailed perspective view of one of the fastening members of the plow point and share. Fig. 5 is a modified form of the fastening member shown in Fig. 4. Fig. 6 is a perspective view of the plow point and share removed from the plow. Fig. 7 is a detailed fragmentary perspective view of the plow share illustrating a latch bar used in connecting the share to the mold board of the plow, and, Fig. 8 is a bottom view illustrating the fastening means between the share and mold board.

Referring to the drawings in detail wherein similar reference numerals designate corresponding parts throughout the several views, the numeral 1 indicates the beam of an ordinary or any preferred form of plow having the usual handles 2 and braces 3 therefor. The mold board 4 and land-side 7 are suitably fixed beneath the beam 1 in any conventional manner. A detachable point and share 6 is adapted to be carried by the plow. The point and share comprises a rearwardly extending landside plate 5, which is adapted to engage against and be secured to the land side 7, and of the share 15 extending at an acute angle to the member 5, which is adapted to have its upper edge abut against the lower edge of a mold board 4 of the plow and to be secured thereto.

The rear portion of the land side 7 of the plow is outwardly offset as at 8 so that the rear end of landside plate 5 of the share will abut against the shoulder 8ª to prevent rearward movement of the share when the same is fastened in position upon the plow.

The land side 7 of the plow is provided with an opening 9ª to permit the free passage of the notched lug 9 inwardly from the landside plate 5 of the share. A wedge-shaped latch 10 is slidably mounted between the spaced guide lugs 22 on the inside portion of the landside 7. The forward end of said latch 10 is bifurcated to receive the notched lug 9, the bifurcation of said bar is inwardly tapered and is adapted to coöperate with the incline walls of said notched lug which causes the landside plate 5 to be securely clamped against the landside 7 of the plow when the latch is moved in engagement with said notched lug.

A lever 11 is pivoted to the rear end of the beam 1 and is provided at its upper end with a suitable handle 12, and is connected at its lower end by the link 13 to the wedge latch 10. The lever 11 is adapted to be secured in adjusted position by a suitable adjustment retaining device 14.

The share 15 of the detachable plow point and share is provided with an upstanding latch bar 16 which is secured at one end to the upward outer corner of the share 15 and upon its inner face. A recess 17 is provided in the lower end of the bar 16 for the reception of the hooked finger 18 of the keeper 19. Said keeper is also provided with a suitable recess 23, indicated by dotted lines, in the body portion thereof to accommodate the free end of the latch bar 16 which extends beyond the upper edge of the share 15. The keeper 19 is formed with slots 21 in the body portion thereof, which are spaced from each other, and is secured to the mold board 4 by the bolts 20 which pass through said slots 21, thus forming a means for readily loosening the keeper 19 and permit of its removal from the slot 17 or replacing it in locking position.

It will be obvious that from the constructions set forth, the fastening members 16 and 19 and the fastening members 9 and 10 respectively will rigidly secure the share to the mold board 4 and the land side 7 and will also admit of a quick and easy removal of the same therefrom.

From the foregoing it will be apparent that I have provided a detachable point for plows having means whereby the latter may be quickly and easily removed for repairs or attached for use.

What I claim is:—

1. In a detachable plow point, the herein described securing means to hold the point and mold board in operative relationship, comprising a notched lug carried by a rear extension on the point, said lug being adapted to extend through an opening in the land side of the plow; a link; a controlling lever and a movable securing member adapted to be drawn into engagement with the inwardly directed end of said lug by said controlling lever and link.

2. The combination with a plow of means to hold the point in detachable, operative relationship with the mold-board comprising a notched lug carried by a rearwardly projecting part of the share, said notched lug adapted to extend through an opening in the landside of the plow; a lever; a link; a wedge shaped bifurcated latch, said latch being adapted to slidably engage the said notched lug by action of said lever and link whereby the share is firmly secured or released.

In testimony whereof I have signed my name to this specification in the presence of two subscribing witnesses.

FREDERICK A. POLZIN.

Witnesses:
S. W. COCKRELL,
C. S. FITZGERALD.

Copies of this patent may be obtained for five cents each, by addressing the "Commissioner of Patents, Washington, D. C."